United States Patent Office 3,264,838
Patented August 9, 1966

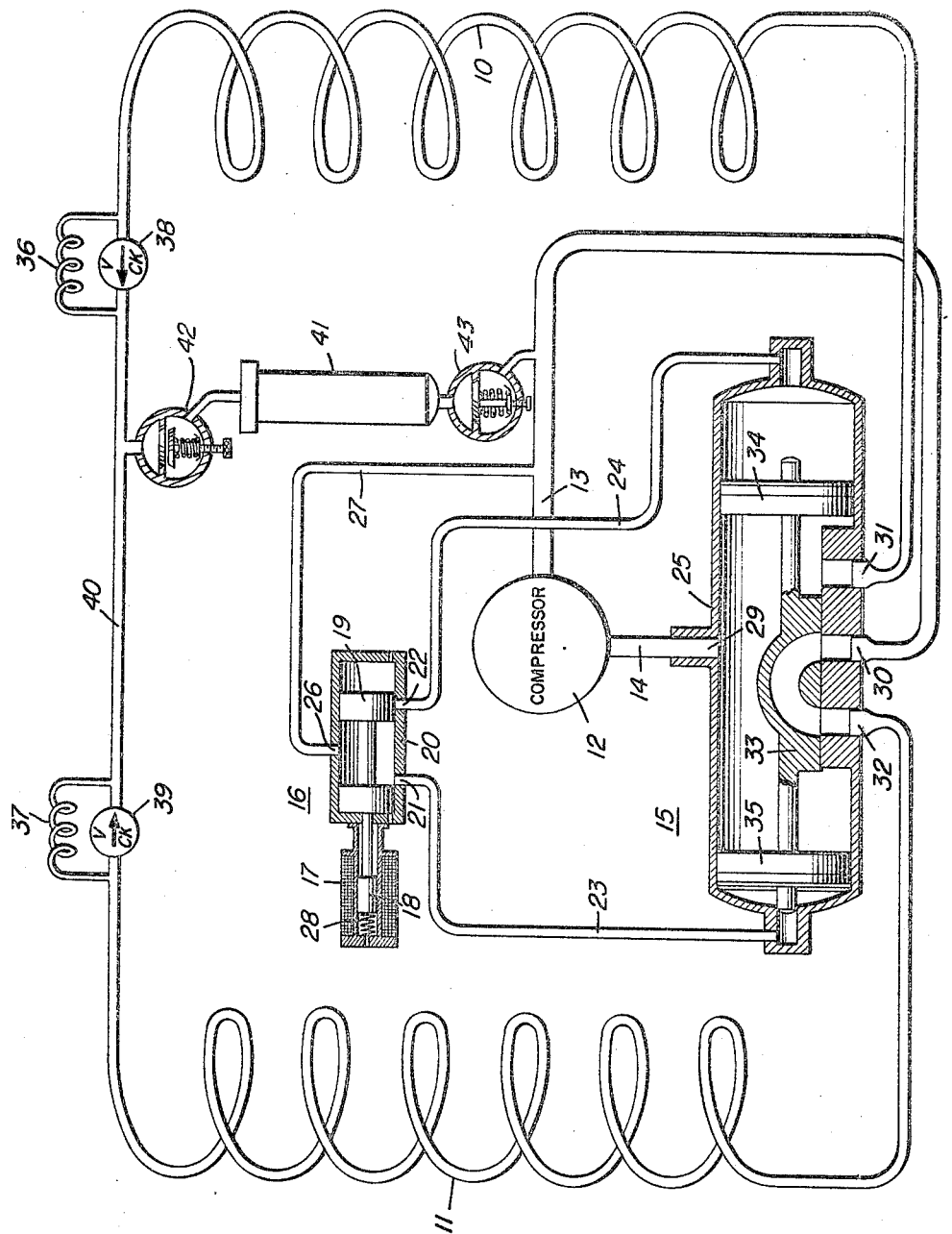

3,264,838
HEAT PUMP AND CHARGE MODULATING MEANS
Sterling C. Johnson, 1841 S. 13th St., Abilene, Tex.
Filed July 26, 1965, Ser. No. 474,831
3 Claims. (Cl. 62—149)

This invention relates to heat pumps and particularly to heat pumps of the split system type provided with a pair of heat exchanges connected in a closed refrigerant circuit and arranged in different separate locations, one of which may be an outdoor unit and the other of which may be an indoor unit. In such a system, either of the heat exchanges may be used to absorb heat from its location while the other is used to emit or reject heat. A reversible connection is provided so that either unit may be used alternatively for either purpose, and, in the present instance, a refrigerant charge modulator or control is provided in order to regulate the effective charge of refrigerant circulated in the closed circuit so as to maintain efficient the operation of the system under various conditions.

The present type of heat pump is particularly useful in cooling an enclosure in the summer and for heating the enclosure during the colder parts of the year. For this purpose, the heat pump system comprises a reversible refrigerant circuit having a heat exchanger indoors and heat exchanger outdoors, either of which can be selectively connected to operate on a cooling cycle and connected directly to a compressor intake, so that it functions as an evaporator, or may be connected to operate as a condenser and connected directly to the compressor discharge. In either case, the second heat exchanger functions in a manner opposite to that of the first heat exchanger. Such heat exchangers are not new in the art, and it is well known that a different quantity of liquid refrigerant must be circulated in the system when it is used to cool an enclosure than when it is used to heat the enclosure to maintain maximum efficiency of operation. The conditions prevailing for the operation of the system in one direction as compared to those prevailing while operating in the other direction usually are such as to require for optimum performance of the heat pump that the effective refrigerant charge flowing through the circuit in the winter or enclosure heating cycle of operation be less than the effective charge in the system during the summer or cooling cycle of operation.

Various arrangements have been suggested for controlling and modulating the charge in the system according to its condition of operation, but all of these have had certain disadvantages in seeking to control the system so that it will operate at its maximum efficiency. The result has been that in many instances a compromise has been used which results in a fair operation but not the best operation for all conditions. At times, such a compromise has not been satisfactory, and a service man has had to purge excess refrigerant or add refrigerant to the system according to the general seasonable demands of the operation.

It is an object of the present invention to provide a heat pump of the split type having an improved arrangement for modulating the effective refrigerant charge in the system so as to obtain optimum performance on both a heating and cooling cycle of operation.

Another object of the present invention is to provide an improved effective refrigerant charge in a split heat pump system which automatically produces the desired maximum efficiency of operation and in which the modulation of the effective charge is adjustable.

Further objects and advantages of this invention will become apparent from the following description referring to the accompanying drawings, and the features of novelty which characterize this invention will be pointed out with particularity in the claims appended to and forming a part of this specification.

In accordance with the present invention, a split system heat pump is provided with a pair of heat exchangers arranged in different separated locations, one of which may be indoors and the other of which may be outdoors. These heat exchangers are connected by suitable tubing into a closed refrigerant circuit, including a compressor and a reversing valve which controls the sense in which the two heat exchangers are operated. The compressor may be of any suitable type having a conventional high-pressure, high temperature gaseous refrigerant discharge line and a low-pressure, low temperature gaseous refrigerant intake line, with a reversing valve reversibly connecting the discharge and intake lines selectively to opposite ones of the two heat exchangers at one of the ends of each. The other ends of the two heat exchangers are connected in series by a conduit through a flow restricting means between each heat exchanger and the conduit for maintaining a pressure difference between the two heat exchangers. Each of the flow restricting means may comprise any suitable conventional device, such as an expansion valve and a bypass around the valve, or it may include a conventional capillary tube restricting device connected in series between the adjacent heat exchanger and its connection to the conduit. With this type of series connection between heat exchangers for maintaining a pressure differential therebetween, control means are provided for the two flow restricting valves whereby one of these valves is bypassed in accordance with the position of the main reversing valve which controls the flow of refrigerant between the compressor and the heat exchangers. In such a system, the compressor intake line is always at a low pressure and a low temperature, while the conduit connecting the two heat exchangers in series is always at a high pressure and a high temperature.

In accordance with the present invention, a refrigerant reservoir is adapted to be connected to the high pressure conduit through a one-way adjustable high pressure-responsive valve and to be connected to the compressor intake line through the one-way adjustable low-pressure-responsive valve. These two pressure-responsive valves are preferably constructed so that their response can be controlled. The high pressure valve is adapted to purge refrigerant from the system to the reservoir if the pressure in the system, and particularly the pressure in the series connecting conduit, exceeds a predetermined value. The low pressure-responsive valve is adapted to supply refrigerant from the reservoir to the intake line when the refrigerant pressure in the intake line falls below a predetermined value. Thus, when the system is operated on a cooling cycle and a larger amount of refrigerant is required, the compressor intake line pressure will tend to fall and the low-pressure-responsive valve will open and supply additional refrigerant from the reservoir to the intake line until the best pressure for optimum conditions is restored. Conversely, during the heating cycle by the indoor heat exchanger when less refrigerant is required by the system, the pressure in the series connecting conduit will tend to rise and the high pressure-responsive valve will open and drain or purge refrigerant from the system into the reservoir until the pressure is lowered to that required for optimum efficiency.

The single figure in the drawing illustrates a heat pump of the split system type provided with an improved refrigerant effective charge modulator embodying the present invention.

Referring to the drawing, an embodiment of the present invention is illustrated in connection with a split system heat pump. The illustrated heat pump comprises a pair of heat exchangers, one of which 10 may be an indoor unit and the other of which 11 may be an outdoor unit. Generally in such systems, the outdoor heat exchanger 11 is somewhat larger than the indoor heat exchanger so as to provide a greater radiation surface to the outdoor unit. As is conventional with this type of heat pump, refrigerant is adapted to be compressed and circulated through the system by a suitable motor-driven compressor 12, which may be controlled by conventional thermostatic control means arranged in the enclosed location the temperature of which is to be modified by the heat pump.

The compressor 12 is connected into the system by an intake line 13 for withdrawing refrigerant vapor from the system and is provided with a discharge line 14 for supplying compressed high-pressure refrigerant vapor to the system. These two compressor lines 13 and 14 are reversibly connected to the heat exchangers 10 and 11 through a reversing valve 15 of any suitable type. This reversing valve 15 selectively connects the discharge line 14 to one of the heat exchangers while connecting the intake line 13 to the other heat exchanger.

In order to control the flow of refrigerant by the reversing valve, a suitable pilot valve 16 is provided. This pilot valve 16 may be of the electromagnetically controlled and operated type, such as illustrated, wherein a solenoid 17 has its core 18 mechanically connected to a suitable valve, such as spool valve 19, slidably arranged within the pilot valve cylindrical casing 20. As shown, the pilot valve casing 20 is formed with three ports, two of which 21 and 22, are connected by suitable tubing 23 and 24 respectively to opposite ends of the cylindrical casing 25 of the reversing valve 15. The third port 26 in the pilot valve casing 20 is arranged intermediate the two ports 21 and 22 and is connected by suitable tubing 27 to the low pressure intake line 13 of the compressor. The spool valve 19 is constructed so that when it is drawn to one operating position by energization of the solenoid 17, as shown in the drawing, the low pressure port 26 communicates with the pilot valve port 21, while the other pilot valve port 22 is sealed. When the pilot valve solenoid 17 is deenergized, the spool valve 19 is biased by any suitable means, such as a compression spring 28, to its other operating position from that shown in the drawing. When the spool valve 19 is in this other operating position, its port 21 is sealed closed and the low pressure port 26 communicates through the valve casing 20 with the third port 22. Thus, the solenoid 17 selectively connects one or the other of the pilot valve ports 21 and 22 to the low pressure intake line 13 of the compressor. The solenoid 17 may be controlled in its operation by any suitable electrical control including a manual energizing switch and if desired also a thermostatic control which may reversibly energize or deenergize the solenoid 17 in response to predetermined temperature conditions. Details of the heat exchangers, the compressor and the two valves including the reversing valve 15 and pilot valve 16 do not, as such, form part of the present invention.

The illustrated reversing valve 15 includes four ports, one 29 of which is permanently connected to the compressor high-pressure discharge line 14, and another 30 of which is permanently connected to the compressor low-pressure intake line 13. The high-pressure port 29 communicates directly with the interior of the reversing valve casing 25, while the low-pressure port 30 is adapted to be reversibly connected to one or the other of ports 31 and 32 which are respectively connected one end of each of the heat exchangers 10 and 11. When one of the ports 31 and 32 is connected to the low-pressure compressor intake line 13, the other of these two ports is open to the interior of the reversing valve casing 25 and thus, is connected to the high-pressure port 29. This reversible connection can be obtained in any suitable manner, and, in the illustration, includes a slidable valve 33 which is operably connected to a pair of pistons 34 and 35 slidably mounted in opposite ends of the cylindrical valve casing 25.

With such arrangement, when the solenoid 17 is energized and the spool 19 is drawn to its illustrated position, the low-pressure intake line 13 of the compressor is connected through the pilot valve 16 to the tubing 23 which connects the low pressure to the end of the reversing valve casing 25 in which the piston 35 is arranged. Since the interior of the reversing valve casing 25 is directly connected to the high-pressure discharge line 14, the inner side of the pistons 34 and 35 are continuously subjected to high-pressure, so that when the end of the casing in which the piston 35 is located is placed under low pressure, the high-pressure within the casing 25 on the inner side of the piston 35 will move this piston towards its end of the casing to the position illustrated in the drawing. Both of the pistons 34 and 35 are provided with suitable bleed holes (not shown), so that when one of the pistons is drawn towards its end of the casing 25, a vacuum is not formed behind the other piston and the valve 33 is readily shifted between its two operative positions. Bleed holes also are provided in the two ends of the pilot valve casing 20 to allow for its free operation.

When the solenoid 17 is deenergized the compression spring 28 will bias the core 18 outwardly of the solenoid and move the pilot spool valve 19 to the opposite end of the casing 20 from that shown in the drawing. When the pilot spool valve is in this position, the port 21 is sealed closed and the port 22 is connected through the casing to the low pressure intake line 13. This subjects to low pressure the end of the reversing valve casing 25 in which the piston 34 is positioned. When this occurs, the high pressure within the reversing valve casing 25 acting on the inner side of the piston 34 will move this piston from the illustrated position toward the adjacent end of the casing 25, thus shifting the valve 33 from the illusrated position to its other operable position in which it connects the lower pressure port 30 to the port 31 and concurrently opens the port 32 to the high pressure within the reversing valve casing 25. In this manner, the ports 31 and 32 respectively connected to one of the ends of the heat exchangers 10 and 11 may be selectively connected to the low pressure intake line 13 of the compressor and alternately to the compressor high pressure discharge line 14.

As has been previously explained, in a split system heat pump of the present type, one of the heat exchangers is adapted to absorb heat from its environment while the other is used to emit heat to its respective environment; and the two heat exchangers are connected in a closed refrigerant circuit. The heat exchanger which functions to absorb heat acts as an evaporator; while the other heat exchanger, which is functioning to emit heat, acts as a condenser, so that the two heat exchangers always function in an opposite sense. In order to control the flow of refrigerant from one heat exchanger to another, a required pressure differential is provided therebetween. This is obtained by use of a refrigerant flow restricting device connected to the opposite end of each heat exchanger from the ends connected to the reversing valve 15 and these connect the two heat exchangers together in series. This flow restricting device may comprise any conventional suitable device, such as a capillary tube 36 connected to an end of the heat exchanger 10 and second capillary tube 37 connected to the corresponding end of the heat exchanger 11. Each of these capillary tubes has associated therewith a bypass line for bypassing the capillary during operation of the system on one of the cycles of operation. Specifically, the capillary tube 36 is provided with a bypass line and check valve 38 which permits the flow of condensed refrigerant through the bypass valve from the heat exchanger 10 when this heat exchanger functions as a condenser to emit heat to its environment. Similarly, the capillary tube 37 connected to an end of the heat exchanger 11 also is provided with a bypass line or passage and check valve 39. The two flow restricting devices are connected in series by a conduit 40, so that on a heating cycle, when the system valves are in the positions illustrated in the drawing, the compressor discharges high-pressure, high-temperature gas through its discharge line 14 into the reversing valve casing 25 from which it passes through port 31 to the heat exchanger 10. This heat exchanger acts as a condenser and yields or emits heat to its ambient, and the high-pressure, high-temperature gas passes out of the heat exchanger 10 as high-pressure, high-temperature liquid refrigerant which flows freely through the bypass passage and check valve 38 into the connecting conduit 40.

During this cycle of operation, the check valve 39 is closed and the high-pressure, high-temperature liquid passes from the conduit 40 through the flow restricting device comprising the capillary tube 37 and is emitted from this flow restricting device into the heat exchanger 11 as a low-pressure, low-temperature liquid refrigerant, is evaporated during its passage through the heat exchanger 11 by the absorption of heat from the ambient of this heat exchanger, and passes from the heat exchanger as low-pressure, low-temperature gas. This low-pressure, low-temperature gaseous refrigerant is drawn by the compressor through the reversing valve port 32, the valve 33, and the reversing valve port 30, into the compressor intake line 13 from which it passes to the compressor for recompressing into high-pressure, high-temperature gas to be recirculated through the system.

For a cooling cycle of operation by the indoor heat exchanger 10, the reverse operation of the check valve 38 and 39 and capillaries 36 and 37 is utilized, such that the heat exchanger supplied with high-pressure, high-temperature gas from the reversing valve 15 will have a flow restricting device check valve open to permit the flow of high-pressure, high-temperature liquid from the heat exchanger into the conduit 40 and the check valve connected to the other heat exchanger will be closed so that the high-pressure, high-temperature liquid from the conduit 40 will have to pass through the capillary tube at the other ends of the conduit and be exhausted therefrom in the form of low-pressure, low-temperature liquid into the other heat exchanger. Thus, regardless of which heat exchanger functions as a condenser, the interconnecting conduit 40 always conducts high-pressure, high-temperature liquid refrigerant between the two heat exchangers.

As has been previously indicated, for any heat pump system of this type there is an optimum charge of refrigerant for the most efficient operation of the system during any particular range of operating conditions. This is due to the fact that for any given charge of refrigerant, a fixed flow-restricting device, such that the illustrated capillary tubes, operates at a maximum efficiency only within a narrow range of temperatures and pressures. For usual installations, this type of heat pump is called upon to operate under a wide variety of temperature-pressure conditions, not only because of the marked differences in the conditions for each heat exchanger when operating on a heat cycle from when it is operating on a cooling cycle, but also due to the wide range of temperatures to which the heat exchangers of the system are normally subjected. For either cycle of operation the indoor heat exchanger is not subjected to a relatively wide variation in temperature during the given cycle; however, due to the great difference in temperature and pressure to which the outdoor heat exchanger is subjected, a variable amount of refrigerant is required to obtain the desired efficiency in the operation of system. Thus, the effective refrigerant charge flowing in the system circuit in the winter or cold season, when the indoor heat exchanger operates on a heat cycle should be less than the effective charge in the system circuit during the summer or cooling cycle of operation of the heat exchanger 10.

The variation in the effective refrigerant charge in the system can conveniently be obtained in accordance with the present invention by the provision of a refrigerant charge modulator. Such a modulator comprises a suitable reservoir 41 connected by a one-way high pressure-responsive valve 42 to the conduit 40 between the two flow restricting devices. This high pressure-responsive valve 42 is connected for response to the pressure in the conduit 40 so as to be opened for admitting refrigerant to the reservoir 41 from the conduit 40 above a predetermined conduit pressure, and to be closed below a predetermined conduit pressure. Preferably, this pressure-responsive valve 42 is of the adjustable type so that the pressure to which it is responsive can be adjusted to predetermined values in order to obtain the most desirable operation and maximum efficiency from the system. In this manner, the high pressure-responsive valve 42 is adapted to purge refrigerant from the system into the reservoir 41 as the pressure in the system, and particularly the pressure in the series connecting conduit 40, exceeds a predetermined value. This normally will occur during the heating cycle by the indoor heat exchanger 10 when less refrigerant is required by the system.

Conversely, during a cooling cycle by the indoor heat exchanger a larger amount of refrigerant will be required so that the pressure in the compressor intake line 13 will tend to fall. A one-way low pressure-responsive valve 43 connects the reservoir 41 to the compressor intake line 13 and is adapted to open and provide a metered supply of refrigerant from the reservoir 41 into the line 13 under these conditions. This pressure-responsive valve 43 is connected so as to be responsive to the pressure in the intake line of the compressor and is adapted to be opened to permit the supply of additional refrigerant into the intake line 13 below a predetermined pressure in this intake line and to be closed above a predetermined intake line pressure. This valve 43 also preferably is adjustable, so that the pressures to which it is responsive can be changed in accordance with the requirements of the system to obtain the most efficient operation thereof. It is of extreme importance that liquid refrigerant entrained in reservoir 41 not to be returned to the system when the system is turned "off." In order to assure this, the valve 43 is a positive closing valve which is responsive to pressures which exist only when the system is in operation. This prevents liquid refrigerant from migrating from the reservoir into the compressor sump when the system is not in operation. In this manner, the two pressure-responsive valves 42 and 43 connect the reservoir 41 respectively to the conduit 40 and to the compressor intake line 13 for draining and supplying refrigerant as required by operating conditions automatically to maintain the system at optimum efficiency.

While a particular embodiment of the present invention has been illustrated and described, modifications thereof will occur to those skilled in the art. It is to be understood, therefore, that this invention is not to be limited to the particular arrangement and structure disclosed, and it is intended in the appended claims to cover all modifications within the spirit and scope of this invention.

What is claimed as new is:

1. A heat pump comprising a pair of heat exchangers connected in a closed refrigerant circuit and arranged in different separated ambient locations either one of which exchangers may be used to heat its respective ambient location while the other is used to absorb heat from its ambient location; means in said circuit including a compressor having a discharge line and an intake line and reversing valve means reversibly connecting said discharge and intake lines selectively to opposite ones of said heat exchangers at one of the ends of each for effecting flow of refrigerant through said circuit in either direction whereby said pump may be operated on a cooling cycle for one heat exchanger with the other heat exchanger functioning as a condenser and receiving high pressure-high temperature gaseous refrigerant from said compressor and exhausting high pressure-high temperature liquid refrigerant therefrom to said circuit and on a heating cycle for said one heat exchanger functioning as the condenser of the system with said other heat exchanger functioning as the evaporator receiving low pressure-low temperature liquid refrigerant from said circuit and exhausting low pressure-low temperature gaseous refrigerant therefrom to said compressor intake; flow-restricting means in said circuit for controlling the flow of refrigerant from one of said heat exchangers to the other and for maintaining a pressure difference between said heat exchangers; said flow-restricting means comprising an expansion valve and bypass means therearound connected to the other end of said one heat exchanger from the connection thereof to one of said compressor lines and another expansion valve and bypass means therearound connected to the other end of said other heat exchanger from the connection thereof to one of said compressor lines; a conduit connecting in series said two flow-restricting means valve and bypass means between said heat exchangers; means controlling said bypass means for selectively bypassing one of said flow-restricting valves in accordance with the position of said reversing valve such that the flow-restricting valve connected to the heat exchanger connected by said reversing valve to said compressor discharge line is bypassed whereby said conduit conducts high pressure refrigerant during both cycles of operation for both heat exchangers; and a refrigerant charge modulator means for controlling the effective refrigerant charge circulating in said circuit; said modulator comprising a reservoir with a one-way high pressure-responsive valve connecting said reservoir to said conduit and connected for response to the pressure in said conduit for admitting refrigerant from said conduit to said reservoir when refrigerant pressure in said conduit exceeds a predetermined value, and a one-way low pressure-responsive valve connecting said reservoir to said compressor intake line and connected for response to the pressure in said intake line for supplying refrigerant from said reservoir to said intake line when refrigerant pressure in said intake line falls below a predetermined value.

2. A heat pump comprising a pair of heat exchangers connected in a closed refrigerant circuit and arranged in different separated locations either one of which exchangers may be used to heat its respective location while the other is used to absorb heat from its location; means in said circuit including a compressor having a high pressure-high temperature gaseous refrigerant discharge line and a low pressure-low temperature gaseous refrigerant intake line and reversing valve means reversibly concurrently connecting said discharge and intake lines selectively to opposite ones of said heat exchangers at one of the ends of each for effecting flow of refrigerant through said circuit in either direction whereby said pump may be operated on a cooling cycle for one heat exchanger functioning as an evaporator with the other heat exchanger functioning as a condenser and receiving high pressure-high temperature gaseous refrigerant from said compressor and exhausting high pressure-high temperature liquid refrigerant therefrom to said circuit and on a heating cycle for said one heat exchanger functioning as the condenser of the system with said other heat exchanger functioning as the evaporator receiving low pressure-low temperature liquid refrigerant from said circuit and exhausting low pressure-low temperature gaseous refrigerant therefrom to said compressor intake; flow-restricting means in said circuit for controlling the flow of refrigerant from either of said heat exchangers to the other and for maintaining a pressure difference between said heat exchangers; said flow-restricting means comprising a thermally controlled expansion valve and a controllable bypass means therearound connected to the other end of said one heat exchanger from the connection thereof to one of said compressor lines and another thermally controlled expansion valve and a controllable bypass means therearound connected to the other end of said one heat exchanger from the connection thereof to one of said compressor lines; a conduit connecting in series said two flow-restricting means valve and bypass means between said heat exchangers; means controlling said bypass means for selectively bypassing one of said flow-restricting valves such that the flow-restricting valve connected to the heat exchanger connected by said reversing valve to said compressor discharge line is bypassed whereby said conduit conducts high pressure-high temperature liquid during both cycles of operation for both heat exchangers; and a refrigerant charge modulator means for controlling the effective refrigerant charge circulating in said circuit, said modulator comprising a reservoir with a one-way flow adjustable high pressure-responsive valve connecting said reservoir to said conduit and connected for response to the pressure in said conduit for admitting refrigerant from said conduit to said reservoir when refrigerant pressure in said conduit exceeds an adjustable predetermined value, and a one-way flow adjustable low pressure-responsive valve connecting said reservoir to said compressor intake line and connected for response to the pressure in said intake line for supplying refrigerant from said reservoir to said intake line when refrigerant pressure in said intake line falls below an adjustable predetermined value.

3. A heat pump as set forth in claim 2 and wherein said one-way flow adjustable low pressure-responsive value is a positive closing valve and has means whereby the same may be disabled and maintained in its closed condition when the heat pump is not in operation.

References Cited by the Examiner

UNITED STATES PATENTS

| | | | |
|---|---|---|---|
| 2,715,317 | 8/1955 | Rhodes | 62—149 |
| 2,951,350 | 9/1960 | Etherington et al. | 62—149 |
| 3,026,686 | 3/1962 | Lowe | 62—149 |
| 3,191,396 | 6/1965 | Ruddock | 62—174 X |

ROBERT A. O'LEARY, *Primary Examiner.*

MEYER PERLIN, *Examiner.*

W. E. WAYNER, *Assistant Examiner.*